United States Patent
Knecht

(10) Patent No.: US 6,201,316 B1
(45) Date of Patent: Mar. 13, 2001

(54) CIRCUIT ARRANGEMENT FOR FUNCTIONAL MODULES ARRANGEABLE IN A VEHICLE

(75) Inventor: Gerhard Knecht, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/101,460

(22) PCT Filed: Dec. 5, 1996

(86) PCT No.: PCT/DE96/02324

§ 371 Date: Nov. 20, 1998

§ 102(e) Date: Nov. 20, 1998

(87) PCT Pub. No.: WO97/25224

PCT Pub. Date: Jul. 17, 1997

(30) Foreign Application Priority Data

Jan. 10, 1996 (DE) .............................................. 196 00 644

(51) Int. Cl.[7] ...................................................... H04L 12/66
(52) U.S. Cl. ......................... 307/10.1; 307/9.1; 370/401; 701/29; 701/102
(58) Field of Search ...................................... 307/10.1, 9.1; 701/29, 102, 48; 340/825.06, 459; 370/401

(56) References Cited

U.S. PATENT DOCUMENTS

| | | | |
|---|---|---|---|
| 5,351,776 | * 10/1994 | Keller et al. | 701/102 |
| 5,369,584 | * 11/1994 | Kajiwara | 340/459 |
| 5,856,976 | * 1/1999 | Hirano | 370/401 |
| 5,948,025 | * 9/1999 | Sonoda | 340/825.06 |

* cited by examiner

Primary Examiner—Albert W. Paladini
(74) Attorney, Agent, or Firm—Kenyon & Kenyon

(57) ABSTRACT

A circuit configuration, in particular for function modules which can be provided in a motor vehicle and connected to a power supply and/or a control circuit, with the function modules being connected to a common gateway, which is implemented via a central unit, over at least two bus systems. The central unit has a central electric module and a motorist information module; a first bus system is connected to the motorist information module; a second bus system is connected to the central electric module, and the gateway is implemented by a network of computer units and provided in the motorist information module and the central electric module and interconnected for data exchange via an interface.

5 Claims, 1 Drawing Sheet

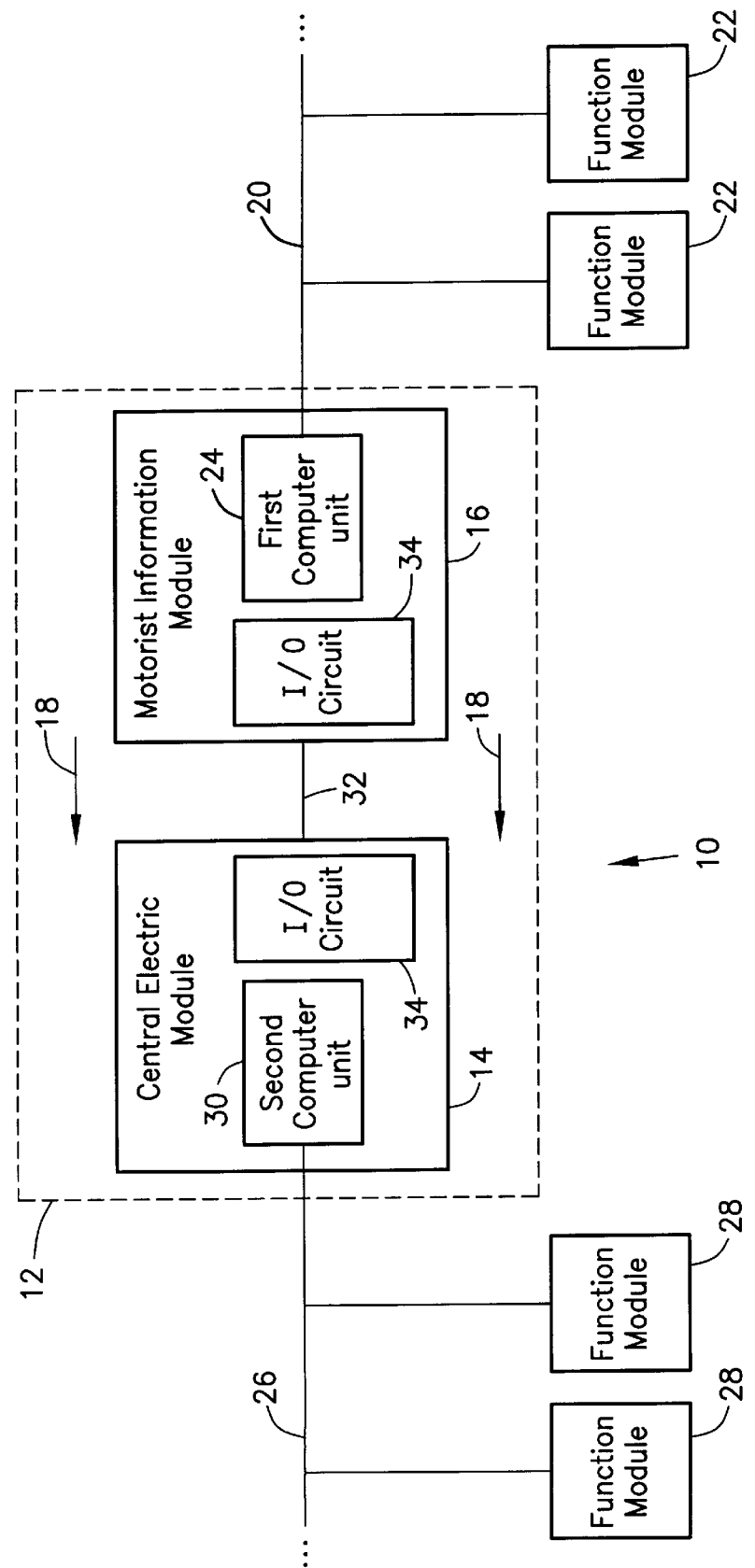

CIRCUIT ARRANGEMENT FOR FUNCTIONAL MODULES ARRANGEABLE IN A VEHICLE

FIELD OF THE INVENTION

The present invention relates a circuit configuration, in particular for function modules which may be provided in a motor vehicle and can be connected to a power supply and/or a control circuit.

BACKGROUND INFORMATION

It is known that multiple function modules can be provided in a motor vehicle. These function modules are generally divided into different groups, which can be assigned to engine management and vehicle body electronics, for example. In addition, there may also be function modules which are used only for special equipment in an automobile, such as radio, car phone, navigation systems, etc. It is known that for data exchange and for driving the individual function modules, the function modules of one group may be connected to a bus system, e.g., a CAN bus, so that drive circuits can be implemented with multiplex technology, i.e., multiple usage of one line. To supply the individual function modules with the data relevant for each, it is known that the individual bus systems can be interconnected through a common gateway, i.e., a network of computers assigned to the individual bus systems. This gateway is responsible for releasing the individual bus systems for information transfer, for example, or for establishing priorities in the transfer and/or exchange of information among the information systems.

Such a gateway is known from IMechE 1989, pages 213–222, where the common gateway is implemented in a central unit having a control unit and a motorist information module. One disadvantage of this arrangement is that the central unit must have a standardized design corresponding to a maximum number of possible function modules, regardless of whether or not the various function modules are present in the vehicle. The motorist information module in particular must keep at readiness all displays which may not actually be needed due to the vehicle equipment selected. Another disadvantage is that, in the implementation of the gateway, a computer must be provided for the gateway in addition to the computer units of the central unit.

SUMMARY OF THE INVENTION

The circuit configuration according to the present invention is advantageous in that it provides a flexible adaptation of the central unit to a certain equipment level of a vehicle plus a common gateway through the central unit without requiring an additional computer. Due to the fact that the central unit with the motorist information module forms one basic unit, with the central unit preferably being detachably connectable to the motorist information module, a first bus system connected to the central unit, a second bus system connected to the motorist information module, the gateway implemented by a network of a computer provided in the central unit and only in the motorist information module. Since the motorist information module is interconnected via an interface, preferably a serial interface, it is possible to perform the gateway functions for all the bus systems using the computers present anyway in both parts, e.g., the central unit or the motorist information module, with the computers communicating over the interface provided. To this extent, it is possible in a simple way to omit the arrangement of an additional microcomputer for performing the gateway functions in the central unit and/or the motorist information module, because the network of computers present in the two parts may also assume the required functions via the interface.

BRIEF DESCRIPTION OF THE DRAWING

The FIGURE shows a block diagram of a circuit configuration according to the invention.

DETAILED DESCRIPTION

The FIGURE shows a circuit configuration, labeled as 10 on the whole, for wiring function modules (to be explained below) in a motor vehicle (not shown). The important part of circuit configuration 10 is a central unit 12 having a central electric module 14 and a motorist information module 16. For reasons of simplicity, there will be no detailed description of central electric module 14 or motorist information module 16, e.g., describing individual displays and individual electronic or electric components.

Central electric module 14 and motorist information module 16 can be detachably connected to one another by suitable connections, e.g., snap connections. Arrows 18 indicate that central electric module 14 can be mechanically connected to motorist information module 16 to form central unit 12.

Motorist information module 16 is connected to a first bus system 20, e.g., a high-speed CAN bus, to which individual function modules 22 of a vehicle engine management system are connected. Function modules 22 may be, for example, an engine injection system, ignition, automatic transmission control, etc. To drive function modules 22 over bus system 20, motorist information module 16 has a computer unit 24 over which a data transfer is implemented via bus system 20 in a generally known manner.

A second bus system 26, e.g., a CAN bus, is connected to central electric module 14. To bus system 26 are connected individual function modules 28 of the vehicle body electronics, e.g., light units, central locking system, air conditioning system, electric seat adjustment, etc. Central electric module 14 has a computer unit 30 for organizing the data transfer over bus system 26.

In addition to the mechanical connection of central electric module 14 to motorist information module 16, an electric connection via a serial or parallel interface 32 is provided. Interface 32 may be designed as a plug connector, with a serial or parallel input-output circuit 34 provided for computer units 24 and 30 to organize data exchange with computer units 24 and 30 via interface 32.

Circuit configuration 10 shown in the FIGURE performs the following function:

When central unit 12 is used as intended, bus system 20 is driven via computer unit 24 of motorist information module 16, while bus system 26 is driven via computer unit 30 of central electric module 14. Optimum data transfer on bus systems 20 and 26 is possible by isolation of bus systems 20 and 26. Since bus system 20 is a high-speed CAN bus, for example, i.e., a high volume of engine management information is supplied at a high iteration rate over function modules 22, data transfer on bus system 26 is not influenced due to the isolation, with function modules 28 supplying or receiving data at a lower iteration rate. Essential data exchange between individual function modules 28 of bus system 26 and function modules 22 of bus system 20 takes place via interface 32, via which computer units 24 and 30 communicate with one another. Thus, the gateway function between bus systems 20 and 26 can be implemented by this connection.

Due to the modular design of central unit 12, it is easy to replace central electric module 14 and/or motorist information module 16. Thus, for example, these modules can easily be adapted to the actual equipment provided in the vehicle. The modules replaced are connected electrically over interface 32, with the remaining module as well as the replaced module of course having proper input/output circuits 34 and computer units 24 and 30. This ensures the required data exchange between bus systems 20 and 26 and the gateway function with each possible configuration of central unit 12.

What is claimed is:

1. A circuit configuration, having function modules adapted to be coupled to a power supply, for a motor vehicle, comprising:

at least two bus systems, the at least two bus systems including a first bus system coupled to a motorist information module and a second bus system coupled to a central electric module, wherein the function modules are adapted to be coupled to a common gateway via the at least two bus systems; and a central unit including the central electric module and the motorist information module, the motorist information module including a first computer unit, the central electric module including a second computer unit, the first and second computer units forming the common gateway, wherein the first and second computer units are adapted to be coupled to one another via an interface for exchanging data.

2. The circuit configuration according to claim 1, wherein the interface is one of a serial interface and a parallel interface.

3. The circuit configuration according to claim 2, wherein the interface is implemented as a plug connector.

4. The circuit configuration according to claim 1, wherein the central electric module and the motorist information module are detachably coupled to one another.

5. The circuit configuration according to claim 1, wherein the first bus system has a first transmission rate, and the second bus system has a second transmission rate, the first transmission rate being different from the second transmission rate.

* * * * *